United States Patent [19]
Shiota et al.

[11] Patent Number: 5,602,951
[45] Date of Patent: Feb. 11, 1997

[54] FERRULE FOR OPTICAL CONNECTOR AND PROCESS FOR MAKING SAME

[75] Inventors: Tetsuo Shiota; Yoshikyo Tamekuni; Tomohiko Ueda; Ichiro Tsuchiya; Toshiaki Kakii, all of Yokohama; Shinji Nagasawa, Mito, all of Japan

[73] Assignees: Sumitomo Electric Industries, Ltd., Osaka; Nippon Telegraph & Telephone Corporation, Tokyo, both of Japan

[21] Appl. No.: 421,882

[22] Filed: Apr. 14, 1995

[30] Foreign Application Priority Data

Apr. 14, 1994 [JP] Japan .................................. 6-099156

[51] Int. Cl.⁶ .................................................. G02B 6/36
[52] U.S. Cl. .............................. 385/81; 385/65; 385/71; 385/77; 385/83; 385/62; 385/59; 385/82; 385/64
[58] Field of Search .................................. 385/65, 71, 72, 385/62, 59, 77, 78, 80, 81, 82, 83, 64, 114, 115, 139, 97, 98, 99

[56] References Cited

U.S. PATENT DOCUMENTS

| | | | |
|---|---|---|---|
| 4,146,301 | 3/1979 | Cherin et al. .......................... | 385/65 X |
| 4,252,407 | 2/1981 | Bubanko et al. ...................... | 385/83 X |
| 4,279,468 | 7/1981 | Turley et al. .......................... | 385/65 X |
| 4,778,243 | 10/1988 | Finzel ..................................... | 385/71 X |
| 4,818,059 | 4/1989 | Kakii et al. ............................ | 385/83 X |
| 5,082,346 | 1/1992 | Myers ..................................... | 385/54 |
| 5,371,820 | 12/1994 | Welbourn et al. ..................... | 385/76 |
| 5,379,361 | 1/1995 | Maekawa et al. ..................... | 385/65 |
| 5,422,971 | 6/1995 | Honjo et al. .......................... | 385/82 X |
| 5,446,815 | 8/1995 | Ota et al. ............................... | 385/33 |

FOREIGN PATENT DOCUMENTS 3291606  12/1991  Japan .................................. 385/81 X

*Primary Examiner*—Brian Healy
*Attorney, Agent, or Firm*—Cushman Darby & Cushman IP Group of Pillsbury Madison & Sutro, LLP

[57] ABSTRACT

The ferrule for optical connector according to this invention comprises a first grip portion having first through holes for insertion of optical fibers and gripping part of said optical fibers apart a predetermined distance from the distal ends of optical fibers; a second grip portion arranged along the insertion direction of optical fibers together with the first grip portion and opposed to the first grip portion through a first space. The second grip portion has second through holes for the optical fibers set through the first through holes to be further introduced therethrough, and grips the vicinity of the distal ends of optical fibers; and a pedestal portion projecting from a surface of the first grip portion.

26 Claims, 8 Drawing Sheets

FERRULE FOR OPTICAL CONNECTOR AND PROCESS FOR MAKING SAME

BACKGROUND OF THE INVENTION

1. Field of the Invention

The present invention relates to structure of a ferrule for optical connector used in optical connectors for optical connection between optical fibers, particularly attached to distal ends of the optical fibers. Further, the invention relates to dies for producing this ferrule and a production process for producing the ferrule, utilizing the dies.

2. Related Background Art

Conventional production processes of the ferrule for optical connector, for example as disclosed in Japanese Laid-open Patent Application No. 3-291606, were arranged to obtain the ferrule for optical connector by pouring a plastic into a cavity inside dies with core pins set therebetween for forming through holes for insertion of optical fibers and solidifying the plastic therein.

The ferrules for optical connector produced by the conventional production processes are constructed in such a manner that a grip portion for gripping optical fibers inserted therein has through holes for the optical fibers to be set therethrough. All insertion ports of the through holes are formed in a flat face of the grip portion, which is a plane perpendicular to an insertion direction of the optical fibers. Further, a gate for the plastic to be poured therethrough into the cavity within the dies is provided in a bottom part of a recess portion forming the cavity in an upper die as a constituent of the dies.

SUMMARY OF THE INVENTION

An object of this invention is to obtain a ferrule for optical fiber having a structure easily mountable to a distal end of an optical fiber and firmly bondable to the distal end of the optical fiber.

The ferrule for optical connector is obtained by bringing an upper die and a lower die into close fit with at least two core pins for forming through holes for insertion of optical fibers being sandwiched therebetween, pouring a resin into a cavity formed inside the dies, and solidifying the resin.

Here, the core pins 3 are preliminarily prepared for forming through holes for optical fibers to be inserted therethrough into the ferrule, as shown in FIG. 1. Each core pin 3 comprises a thin portion 3a for forming a through hole and a thick portion 3b having a larger diameter than the thin portion 3a, which are connected to each other through a tapered portion. This is for facilitating drawing of the core pins upon fabrication of ferrule and for making guide grooves large enough to first guide distal ends of optical fibers thereon. These core pins 3 are fixed by a core pin grip plate 4 at one end thereof in order to maintain intervals between them. Both core pins 3 and core pin grip plate 4 are made of a metal material.

The core pin grip plate 4 is composed of an upper grip plate 4a and a lower grip plate 4b, which sandwich the core pins 3 in order to firmly grip the core pins 3. Further, the end face of the lower grip plate 4b is projected out by length W3 from the end face of the upper grip plate 4a toward the distal ends of core pins 3.

The upper die 1 is provided with a recess portion 10, as shown in FIG. 1, and further with a first upper grip portion 14 formed in an edge portion surrounding the recess portion 10 and in a surface (main surface 1a of the upper die 1) to be closely fit to the lower die 2, and a second upper grip portion 12 projecting from a predetermined portion in a bottom part 10a of the recess portion 10 normally to the bottom part 10a and having a grip surface 12a for pushing the predetermined part of the core pins 3. That is, the grip surface 12a is disposed on the same plane on which the main surface 1a of the upper die is disposed, and therefore the height of the second upper grip portion 12 equals to that of the edge portion of the upper die 1. Further, this upper die 1 has an upper engagement groove 15 for gripping the core pin grip plate 4 which pinches to secure one ends of core pins 3, with the lower die 2 at a position opposite to the first upper grip portion 14 with the recess portion 10 inbetween and on the main surface 1a of the upper die 1 surrounding the recess portion 10. The upper die 1 also has fixing grooves 13a, 13b, 13c, 13d for fixing reference pins 5a, 5b in the cavity in parallel with an insertion direction C of the core pins 3, in the surface 1a of the edge portion. The reference pins 5a, 5b are prepared for forming guide holes 750a, 750b (FIG. 7) for setting guide pins therein prepared for well maintaining a setting position between a front end face 750 of the ferrule and an end face of another member to be optically connected therewith.

On the other hand, the lower die 2 is also provided, as shown in FIG. 1, with a recess portion 20, and further with a first lower grip portion 24 provided in an edge portion surrounding the recess portion 20 and in a surface (main surface 2a of the lower die 2) to be closely fit to the upper die 1, provided at a position where it comes to match with the first upper grip portion 14 when the upper die 1 and lower die 2 are brought into close fit to each other as pinching the core pins 3 for forming the through holes for insertion of optical fibers, and arranged to grip the vicinity of the distal ends of core pins 3 together with the first upper grip portion 14, and a second lower grip portion 22 projecting from a predetermined portion in a bottom part 20a of the recess portion 20 normally to the bottom part 20a and having a grip surface 22a arranged to grip part of each core pin 3 together with the second upper grip portion 12 when the upper die 1 and lower die 2 are brought into close fit as pinching the core pins 3 for forming the through holes for insertion of optical fibers.

Particularly, a length W2 in the insertion direction C of core pins 3, of the grip surface 22a provided in the second lower grip portion 22 is set to be greater than a length W1 in the insertion direction C of core pins 3, of the grip surface 12a provided in the second upper grip portion 12.

Here, the first lower grip portion 24, and the grip surface 22a of second lower grip portion 22 are provided with guide grooves 24a, 22b, respectively, for positioning the core pins 3, as arranged along the insertion direction C of the core pins 3. Further, the lower die 2 is provided with V-shape fixing grooves 23a, 23b, 23c, 23d for fixing the reference pins 5a, 5b along the insertion direction C of core pins 3 together with the above-described upper die 1. Also, a lower engagement groove 25 for fixing the core pin grip plate 4 is provided between the fixing grooves 23b, 23d and on the main surface 2a of the lower die 2. The lower engagement groove 25 is opposed to the upper engagement groove 15 when the upper die 1 and the lower die 2 are brought into close fit.

Further, the lower die 2 has a projection 26 projecting from the bottom part 20a of the recess portion 20 between the second lower grip portion 22 and the lower engagement groove 25 normally to the bottom part 20a, and the projection 26 comes into contact with the lower grip plate 4b of the core pin grip plate 4 when the upper die 1 and the lower die 2 are brought into close fit.

The lower die 2 further has grooves 27a, 27b for communicating the recess portion 20 to the outside of the lower die 2, in the edge surface 2a of the edge portion surrounding the recess portion 20, whereby when the upper die 1 and the lower die 2 are brought into close fit, the groove 27a, 27b and the main surface 1a of the upper die 1 (the edge surface of the edge portion surrounding the recess portion 10) define a gate 270 for connecting the cavity constructed of the recess portion 10 of upper die 1 and the recess portion 20 of lower die 2 with the outside of the dies.

The upper die 1 and lower die 2 so arranged are brought into close fit to each other with the core pins 3 being pinched between them, as shown in FIG. 2, a resin is poured into the cavity formed inside the dies through the gates 270 formed by the upper die 1 and lower die 2, and the resin is let to solidify. After the resin is solidified, the core pins 3 are drawn in the reverse direction to the insertion direction C, and further, the upper die 1 and lower die 2 are vertically separated from each other, thereby obtaining a ferrule for optical connector as shown in FIG. 7. Stems 740 are formed corresponding to the gates 270 in the ferrule taken out of the upper and lower dies 1, 2, and are cut off later on. The reason why the gates 270 for pouring the resin therethrough are formed by the upper die 1 and lower die 2 as described above is that release of the ferrule is made easier from a fit state in the recess portion 10 of upper die 1 and the recess portion 20 of lower die 2.

The ferrule for optical connector thus obtained through the above production steps has, as shown in FIGS. 7 and 8, an opening portion 700 provided in a back face 700a of the ferrule, for introducing the distal ends of optical fibers from the outside into a first space 711 inside the ferrule, a first grip portion 710 arranged along the insertion direction D of optical fibers and opposite to the opening portion 700 through the first space 711, and a second grip portion 720 located to form a front face 750 of the ferrule along the insertion direction D of optical fibers and opposite to the first grip portion 710 through a second space 721. In particular, the first grip portion 710 has first through holes 712 for optical fibers to be set therethrough, grips part of the optical fibers apart a predetermined distance from the distal ends of optical fibers, and partitions the space inside the ferrule into the first space 711 and the second space 721 as described above. Also, the second grip portion 720 has second through holes 722 for the optical fibers introduced through the first through holes 712 to be set further therethrough, and grips the vicinity of the distal ends of optical fibers. It is noted here that the insertion direction D of optical fibers as described above coincides with the insertion direction C of core pins 3 shown in FIG. 1.

Particularly, the ferrule for optical connector is provided with a first pedestal portion 713 projecting from a surface 710a, which is a face of the first grip portion 710, facing the opening portion 700 through the first space 711 toward the opening portion 700. The first pedestal portion 713 has a guide surface 715 for guiding the distal ends of optical fibers introduced into the first space 711 through the opening portion 700, into the first through holes 712 in the first grip portion 710. As described above, the first pedestal portion 713 with the guide surface 715 in the length W3 is formed by the structure in which the upper grip plate 4a is shifted by W3 relative to the lower grip plate 4b.

This guide surface 715 functions to prevent the distal ends of optical fibers from deviating in the vertical direction with respect to entrances of the through holes 712. Also, the guide surface 715 is provided with guide grooves 714 corresponding to the respective through holes 712. The guide grooves 714 extend along the insertion direction D of optical fibers and are connected to the first through holes 712 in the first grip portion 710. This ensures that the respective optical fibers introduced into the first space 711 are surely inserted into the associated entrances of the respective through holes 712 to be set without horizontal deviation.

The ferrule for optical connection is provided with a second pedestal portion 723 projecting from a surface 720a, which is a face of the second grip portion 720, facing the first grip portion 710 through the second space 721 toward the first grip portion 710, and this second pedestal portion 723 has a first face (support face 725) for supporting part of the optical fibers (portions thereof apart a predetermined distance from the distal ends thereof and having a length W4), and a second face 726 apart a predetermined distance through the second space 721 from the first grip portion 710.

The ferrule and corresponding portions of optical fibers are bonded to each other with an adhesive agent into the second space 721, and the support face 725 works as a surface for increasing adhering regions between the optical fibers and the ferrule and improving bonding strength. In other words, by providing the support face 725 parallel to the insertion direction of optical fibers as a bonding surface, the bonding surface (support face 725) contributes to adhesion as a resistive force against a withdrawing force of the optical fibers. Further, the support face 725 is provided with guide grooves 724 corresponding to the second through holes 722. The guide grooves 724 extend along the insertion direction D of optical fibers and are connected to the associated second through holes 722 in the second grip portion 720. This ensures that the distal ends of optical fibers are surely introduced into the second through holes 722 even if the insertion direction of the distal ends of optical fibers deviates in the horizontal direction. The horizontal direction coincidents with an arrangement direction E of the first and second through holes 712, 722(see FIGS. 8 and 16).

Further, the ferrule for optical connector has a window 730 for communicating the first space 711 to the outside of the ferrule, in a surface 731, which is a surface defining the first space 711, located in parallel with the insertion direction of optical fibers. This permits a worker to mount the ferrule on the optical fiber ends as observing the positions of optical fiber ends through the window 730, which improves work efficiency and which can fully achieve the object of the invention, based on the structural features as described above.

The reason why the projection portion 26 provided on the bottom part 20a of the recess portion 20 in the lower die 2 is constructed so that it comes into contact with the lower grip plate 4b of the core pin grip plate 4 when the upper die 1 and lower die 2 are brought into close fit, as described above, is that the window 730 is purposed to form.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

The ferrule for optical connector according to the present invention, the production process therefor, and the structure of the metal dies used in the production process will be described in order using FIGS. 1 to 18.

Figure 1:
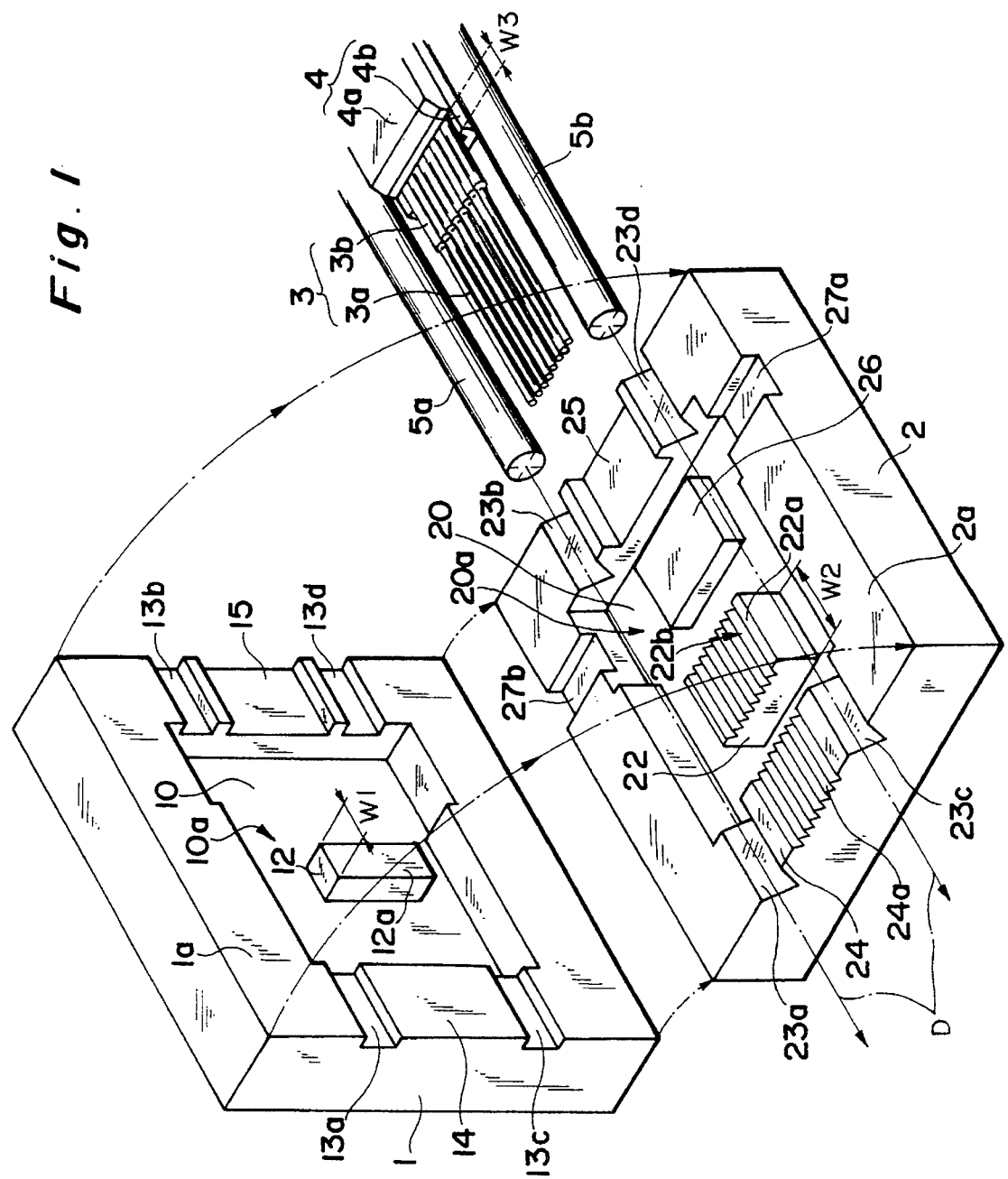
FIG. 1 is a perspective view to show the structure of dies (upper die and lower die) for producing a ferrule for optical connector according to the present invention.

The ferrule for optical connector according to the present invention is obtained in such a process that the upper and lower dies 1, 2 are brought into close fit to each other with at least two core pins 3 for forming through holes for insertion of optical fibers being sandwiched between the dies, as shown in FIG. 1, that a resin is poured into a cavity formed inside the dies (plastic molding), and that the resin is let to solidify. The cavity formed inside the dies is a space obtained when the upper and lower dies 1, 2 each with a recess portion 10, 20 of a predetermined configuration formed in the main surface thereof are brought into close fit so as to make the recess portions 10, 20 coincident with each other. Specific examples of the plastic molding method are transfer molding and injection molding. The upper and lower dies 1, 2 are formed of a same metal material.

The core pins 3 are preliminarily prepared for forming through holes for insertion of optical fibers in the ferrule for optical connector. Each core pin 3 is formed of a metal material and consists of a thin portion 3a for forming a through hole and a thick portion 3b having a larger diameter than the thin portion 3a, which are connected to each other through a tapered portion. Also, these core pins 3 are fixed by a core pin grip plate 4 at one end thereof in order to maintain intervals between them. The core pin grip plate 4 of metal has the upper grip plate 4a and the lower grip plate 4b pinching the core pins 3 between them in order to firmly grip the core pins 3. These plates 4a, 4b are also formed of a same metal material.

Particularly, the end face of the lower grip plate 4b is projected by W3 from the end face of the upper grip plate 4a toward the distal ends of core pins 3.

The upper die 1 has the recess portion 10 in the main surface thereof, and an edge surface 1a which is a surface of the edge portion surrounding the recess portion 10 and which is arranged to go into close fit with the lower die 2, constitutes the main surface of the upper die 1. When this edge surface comes into close fit with the lower die 2, the edge portion defines the cavity inside the dies. In the surface 1a of this edge portion there are the first upper grip portion 14 and upper engagement groove 15, and fixing grooves 13a, 13b, 13c, 13d for fixing the reference pins 5a, 5b. Further, formed on the bottom part 10a in the recess portion 10 of the upper die 1 is the second upper grip portion 12 projecting from a predetermined portion thereof normally to the bottom part 10a. The second grip portion 12 has the grip surface 12a for pressing the predetermined part of the core pins 3 with a second lower grip portion 22 and having the length of W1 in the insertion direction C of core pins 3. The grip surface 12a is disposed on the same plane on which the main surface 1a of the upper die 1 is disposed, and therefore the height of the second grip portion 12 will equal to that of the edge portion surrounding the recess portion 10 of the upper die 1.

On the other hand, the lower die 2 is provided with the recess portion 20, and the edge surface 2a which is a surface of the edge portion surrounding the recess portion 20 and which is arranged to come into close fit with the upper die 1, constitutes the main surface of the lower die 2. When the edge surface is brought into close fit with the upper die 2, the edge portion can define the cavity inside the dies. In the surface 2a of this edge portion there are provided the first lower grip portion 14, the lower engagement groove 25, and the V-shape fixing grooves 23a, 23b, 23c, 23d for fixing the reference pins 5a, 5b together with the upper die 1. The reference pins 5a, 5b are formed of a same metal material. Further, grooves 27a, 27b to become resin pouring ports (gates 270) are provided normally to the insertion direction C of core pins 3 in this surface 2a. The second grip portion 22 is formed on the bottom part 20a in the recess portion 20 of the lower die 2 so as to project from the predetermined portion thereof normally to the bottom part 20a. This second lower grip portion 22 has the grip surface 22a for gripping the predetermined part of the core pins 3 with the second upper grip portion 12 and having the length of W2 in the insertion direction C of core pins 3. The grip surface 22a is disposed on the same plane on which the main surface 2a of the lower die 2 is disposed, and therefore the height of the second lower grip portion 22 will equal to that of the edge portion surrounding the recess portion 20 of the lower die 2.

Further, guide grooves 24a, 22b for positioning the core pins 3 are formed along the direction C in the first lower grip portion 24 and in the grip surface 22a of the second grip portion 22, respectively. By this, when the upper die 1 and the lower die 2 are brought into close fit while pinching the core pins 3 between them, the first lower grip portion 24 grips part of each core pin 3 together with the first upper grip portion 14, while the grip surface 22a of the second lower grip portion 22 grips part of each core pin 3 together with the grip surface 12a of the second upper grip portion 12.

Further, the lower die 2 is provided with the projection portion 26 projecting from the bottom part 20a in the recess portion 20 between the second lower grip portion 22 and the lower engagement groove 25 normally to the bottom part 20a.

In particular, the length W2 in the insertion direction C of core pins 3, of the grip surface 22a provided in the second lower grip portion 22 is set to be greater than the length W1 in the insertion direction C of core pins 3, of the grip surface 12a provided in the second upper grip portion 12. In other words, supposing the lengths of the grip surfaces in the normal direction to the insertion direction C of core pins 3 are equal to each other, an area of the grip surface 22a provided in the second lower grip portion 22 becomes larger than that of the grip surface 12a provided in the second upper grip portion 12.

Figure 2:
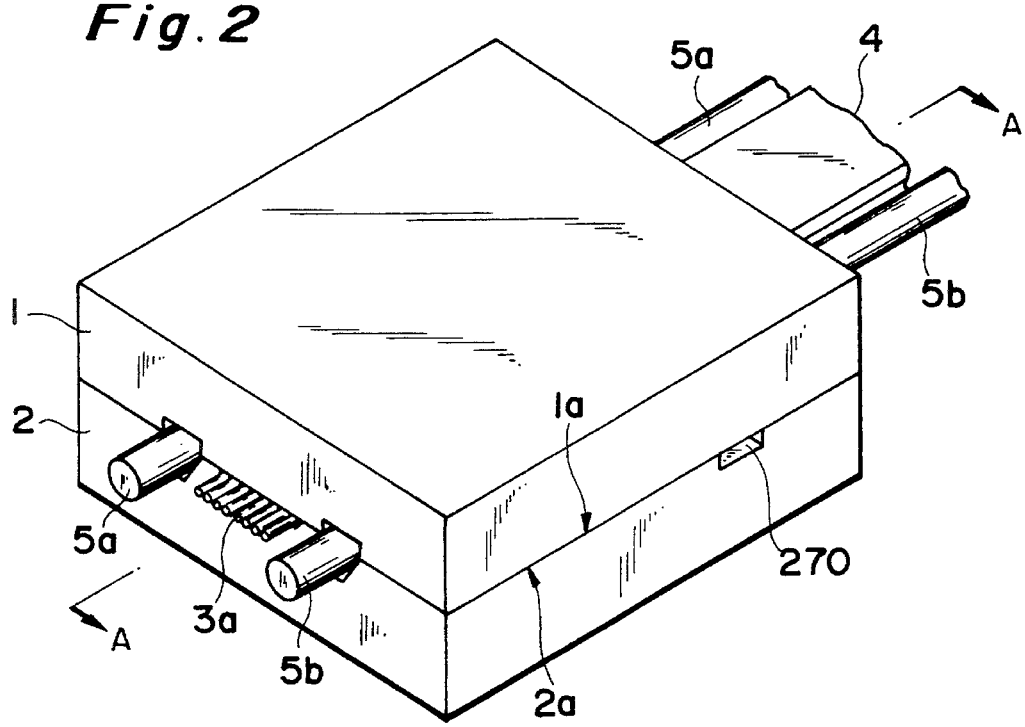
FIG. 2 is a perspective view to show a state in which the upper die and lower die shown in FIG. 1 are brought into close fit to each other with core pins sandwiched between them.

These upper die 1 and lower die 2 are brought into close fit while pinching the core pins 3 together with the core pin grip plate 4, as shown in FIG. 2, thereby forming the cavity for plastic molding of the ferrule for optical connector therein.

Figure 3:
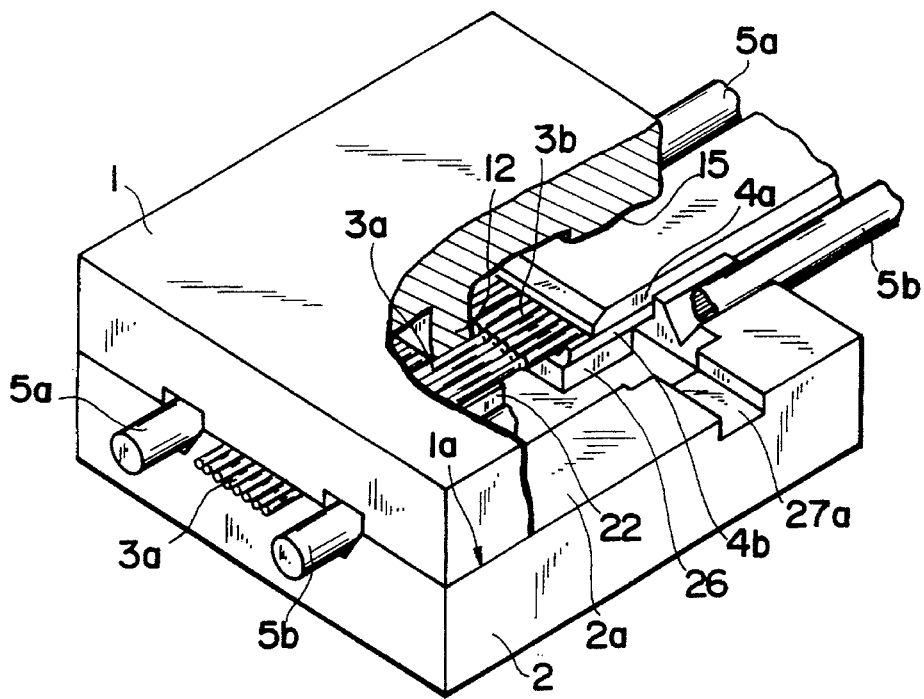
FIG. 3 is a perspective view, partly in cross section, to show the structure inside the dies in a close fit state of the upper die and lower die shown in FIG. 2.

Next described referring to FIG. 3 is the internal structure when the upper die 1 and lower die 2 are made closely fit to each other as shown in FIG. 2.

The core pin grip plate 4, fixing one ends (thick portions 3b ) of core pins 3, is firmly secured by the upper engagement groove 15 and lower engagement groove 25. Namely, the upper grip plate 4a of the core pin grip plate 4 is in contact with the upper engagement groove 15, and the lower grip plate 4b in contact with the lower engagement groove 25. Also, the lower grip plate 4b is also in contact with the projection portion 26 provided in the recess portion 20 of the lower die The thin portions 3a of core pins 3 are firmly gripped by the second upper grip portion 12 and the second lower grip portion 22 and the distal ends of the thin portions 3a are also firmly gripped by the first upper grip portion 14 and the first lower grip portion 24 in a similar manner.

Figure 4:
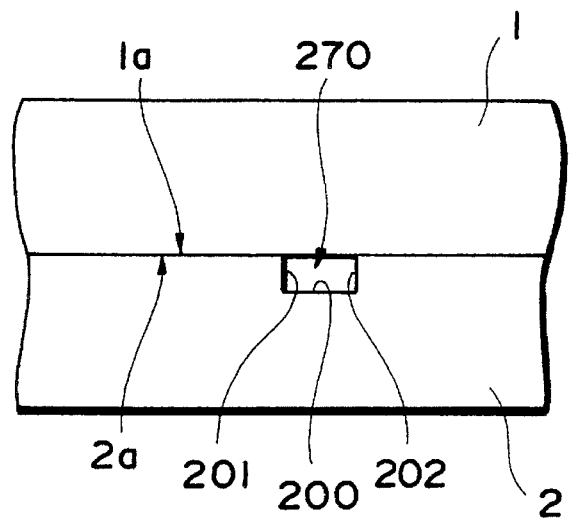
FIG. 4 is a drawing to show a first application example of the gate (resin pouring port) shown in FIG. 2.
Figure 5:
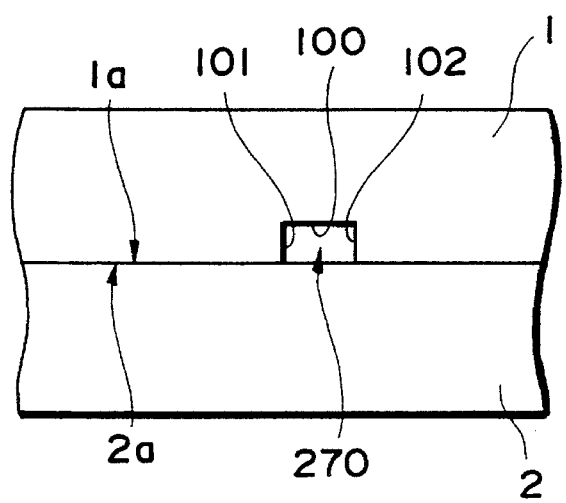
FIG. 5 is a drawing to show a second application example of the gate (resin pouring port) shown in FIG. 2.
Figure 6:
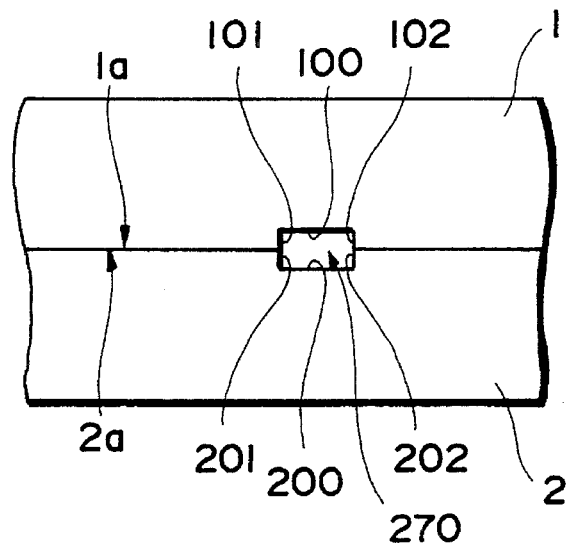
FIG. 6 is a drawing to show a third application example of the gate (resin pouring port) shown in FIG. 2.

The structure of gates 270 as resin pouring ports are next described referring to FIGS. 4 to 6.

The lower die 2 already described is provided with the grooves 27a, 27b for communicating the recess portion 20 to the outside of the lower die 2, in the edge surface 2a of the edge portion surrounding the recess portion 20, as shown in FIG. 4 (first application example). By this, when the upper die 1 and lower die 2 are brought into close fit, the grooves 27a, 27b and the main surface of the upper die 1 (the edge surface 1a of the edge portion surrounding the recess portion 10) define the gates 270 for communicating the cavity formed by the recess portion 10 of upper die 1 and the recess portion 20 of lower die 2, to the outside of the dies.

Namely, the arrangement that a gate 270 is formed by faces 200, 201, 202 forming the groove 27a, 27b and the edge surface 1a of the upper die 1, facilitates removal of the ferrule remaining in a fit condition in the recess portions 10, 20. The reason why the gates 270 for pouring the resin therethrough are formed by the upper die 1 and lower die 2 in this manner is to facilitate removal of the ferrule remaining in a fit condition in the recess portion 10 of the upper die 1 and the recess portion 20 of the lower die 2.

In a second application example, as shown in FIG. 5, the grooves are provided in the edge surface 1a of upper die 1. In this structure, each gate 270 is formed by faces 100, 101, 102 forming the groove and the edge surface 2a of the lower die 2.

In a third application example, as shown in FIG. 6, the grooves are formed across the edge surfaces 1a, 2a of the upper die 1 and lower die 2. In this structure, each gate 270 is constructed of faces 100, 101, 102 forming the groove of the upper die 1 and faces 200, 201, 202 forming the groove of the lower die 2.

Figure 7:
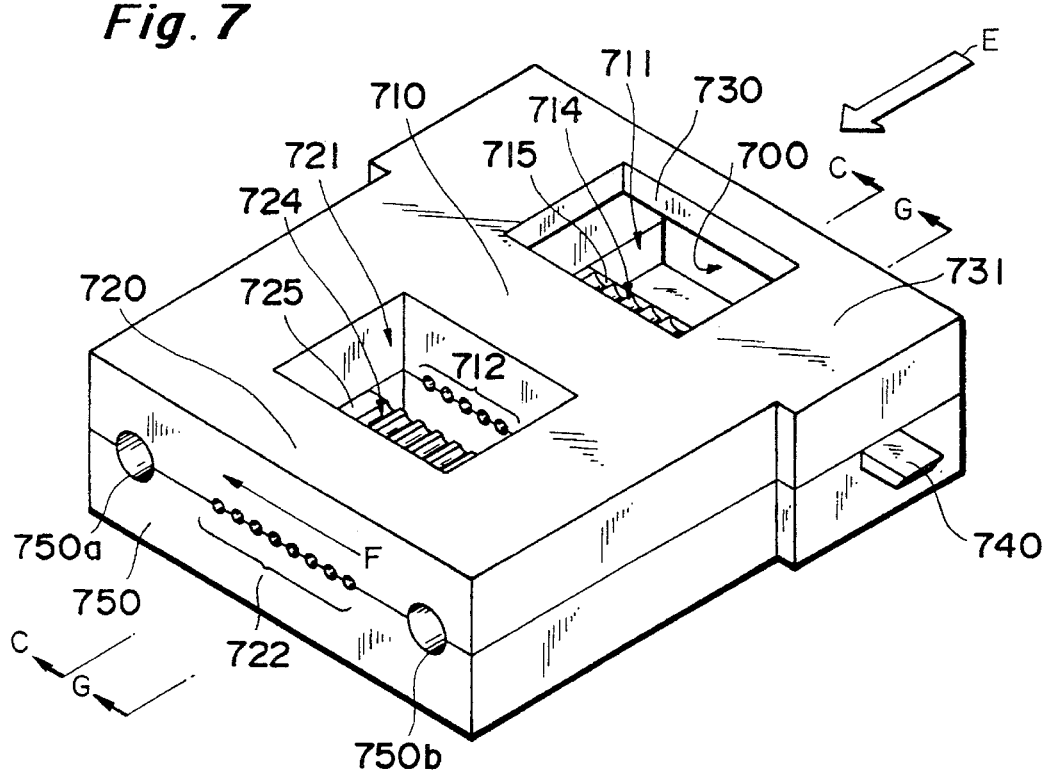
FIG. 7 is a perspective view to show the structure of the ferrule for optical connector according to the present invention.

As shown in FIG. 2, a resin, for example plastic, is poured into the cavity formed inside the dies through the gates 270 formed by the upper die 1 and lower die 2 as brought into cross fit to each other as described above, and the resin is let to solidify (plastic molding). Specific examples of the plastic molding are the transfer molding, the injection molding, etc. After the resin inside the cavity is solidified, the core pins 3 are withdrawn in the reverse direction to the insertion direction C. Similarly, the reference pins 5a, 5b are also withdrawn in the reverse direction to the insertion direction C. Further, the upper die 1 and the lower die 2 are vertically separated from each other, thereby obtaining the ferrule for optical connector as shown in FIG. 7. Stems 740 are formed corresponding to the gates 270 in the ferrule for optical connector taken out of the upper and lower dies 1, 2, and they are cut off later on.

For example, one of alloy tool steels lends itself to use for the upper and lower dies 1, 2, because they have superior abrasion resistance and rust prevention. Similarly, the core pins 3 and the reference pins 5a, 5b are respectively made of an alloy tool steel or a hard metal (cemented carbide). The upper and lower grip plate 4a, 4b are made of the same material as the core pins 3. As a material that lends itself to use for plastic poured into the cavity formed inside of the dies, thermosetting plastic containing filler such as silica and the like is suitable. Because, it does not occur the changing a shape thereof for a long time, a ferrule having a high reliability regarding a scale thereof can be obtained. Further, a reference regarding a plastic molding is, for example, "PURASUTIKKU SEIKEI KAKOU DETABUKKU" in japanese (issued by NIHON SOSEI KAKOU GAKKAI; published by NIKKEIKOUGYOUSINBUNSYA; first edition, Mar. 25, 1988). Particularly, on pages 253–262, this reference teaches a detail process of a transfer molding.

Figure 8:
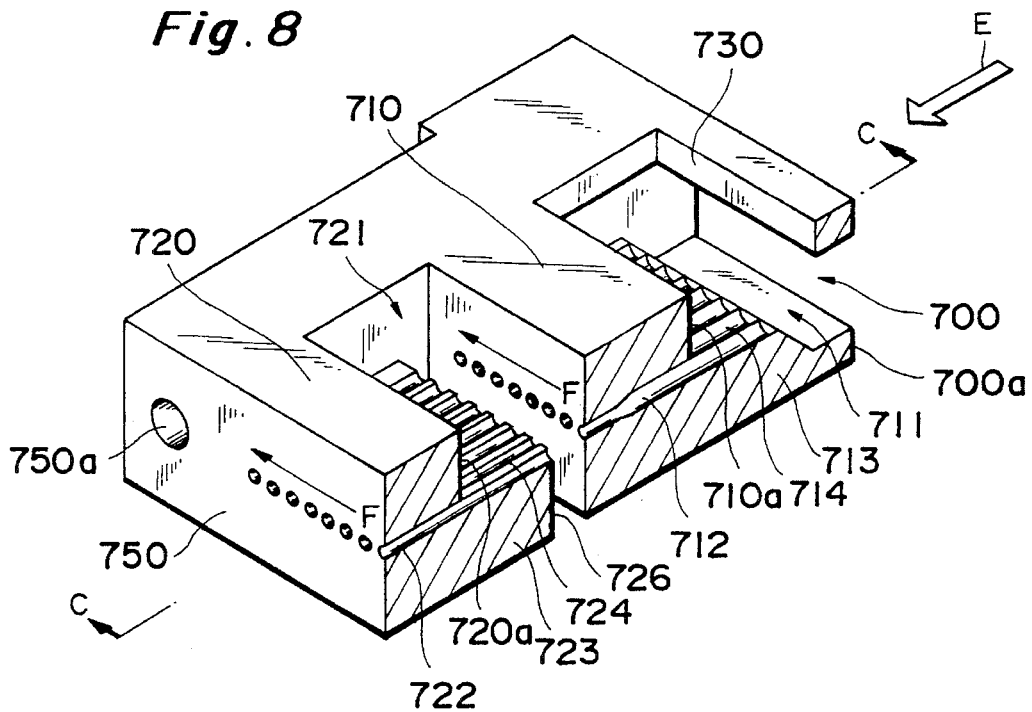
FIG. 8 is a perspective view, partly in cross section of the ferrule for optical connector along G—G line in FIG. 7, to show the internal structure of the ferrule for optical connector shown in FIG. 7.

The ferrule for optical connector thus obtained through the above production steps has, as shown in FIGS. 7 and 8, the opening portion 700 provided in the back face 700a of the ferrule, for introducing the distal ends of optical fibers from the outside into the first space 711 inside the ferrule, the first grip portion 710 arranged along the insertion direction D of optical fibers and opposed to the opening portion 700 through the first space 711, and the second grip portion 720 located to form the front face 750 of the ferrule along the insertion direction D of optical fibers and opposed to the first grip portion 710 through the second space 721. In particular, the first grip portion 710 has first through holes 712 for optical fibers to be set therethrough, grips part of the optical fibers apart a predetermined distance from the distal ends of optical fibers, and partitions the space inside the ferrule into the first space 711 and the second space 721 as described above. Also, the second grip portion 720 has second through holes 722 for the optical fibers introduced through the first through holes 712 to be set further therethrough, and grips the vicinity of the distal ends of optical fibers. It is noted here that the insertion direction D of optical fibers as described above coincides with the insertion direction C of core pins 3 shown in FIG. 1.

Particularly, the ferrule for optical connector is provided with the first pedestal portion 713 projecting from the surface 710a, which is a face of the first grip portion 710, opposed to the opening portion 700 through the first space 711 toward the opening portion 700. The first pedestal portion 713 has the guide surface 715 for guiding the distal ends of optical fibers introduced into the first space 711 through the opening portion 700, into the first through holes 712 in the first grip portion 710. This guide surface 715 is opposed to portions of a predetermined length of the optical fibers (portions corresponding to the length W3) along the arrangement direction E of the first through holes 712, and this structure can be obtained, as described previously, by shifting the end face of the upper grip plate 4a, securing one ends of core pins 3, from the end face of the lower grip plate 4b.

This guide surface 715 functions to prevent the distal ends of optical fibers from deviating in the vertical direction with respect to entrances of the through holes 712. Also, the guide surface 715 is provided with guide grooves 714 corresponding to the respective through holes 712. The guide grooves 714 extend along the insertion direction D of optical fibers and are connected to the first through holes 712 in the first grip portion 710. This ensures that the respective optical fibers introduced into the first space 711 are surely inserted into the associated entrances of the respective through holes 712 to be set without horizontal deviation. The horizontal direction H coincidents with the arrangement direction E of the first and second through holes 712, 722.

Figure 11:
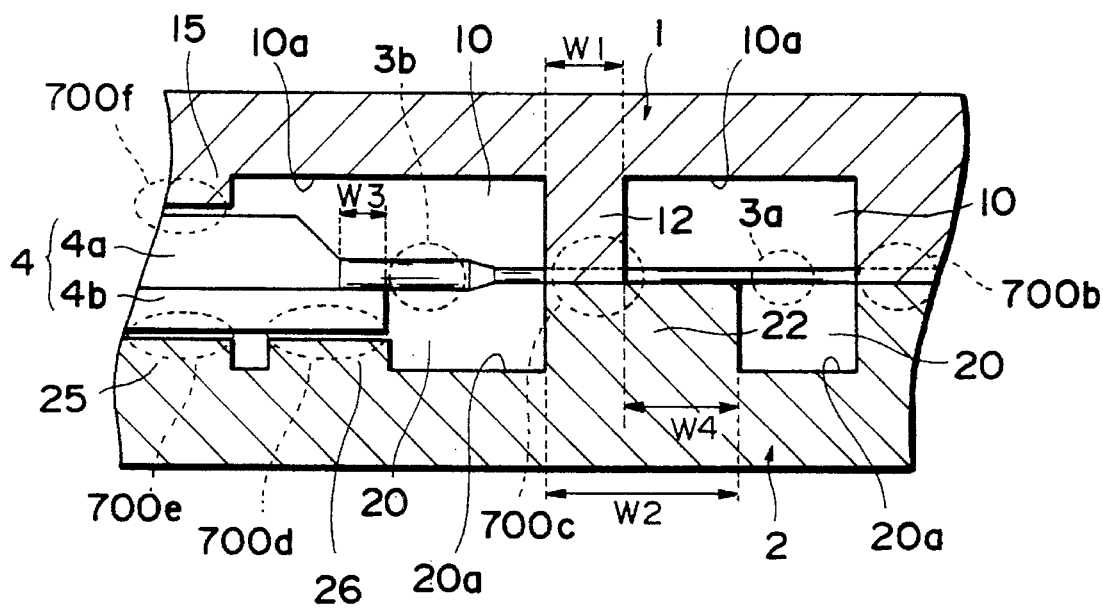
FIG. 11 is a cross-sectional view to show a cross section of the dies along A—A line in FIG. 2.
Figure 12:
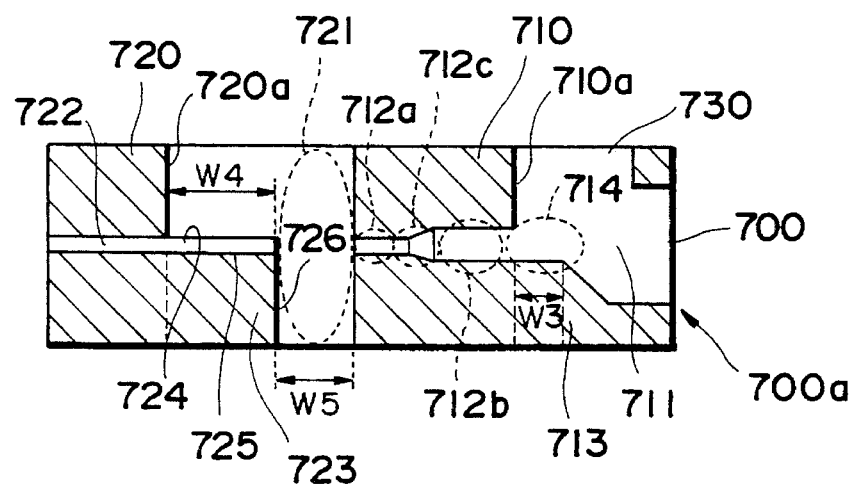
FIG. 12 is a cross-sectional view to show a cross section of the ferrule for optical connector along B—B line in FIG. 7.

The ferrule for optical connection is provided with the second pedestal portion 723 projecting from the surface 720a, which is a face of the second grip portion 720, opposed to the first grip portion 710 through the second space 721 toward the first grip portion 710, and the second pedestal portion 723 has the first face (support face 725) opposed to part of the optical fibers (portions being apart a predetermined distance from the distal ends thereof and having the length W4) along the arrangement direction E of the second through holes 722, and the second face 726 apart a predetermined distance W5 through the second space 721 from the first grip portion 710. Here, the length W5 is coincident with the length W1 of the grip surface 12a of the second upper grip portion 12 shown in FIG. 1, while the length W4 is coincident with a difference between the lengths W1 and W2 of the grip surfaces 12a, 22a of the first and second grip portions 12, 22 shown in FIG. 1 (FIGS. 1, 11, and 12). The second face 726 is a surface parallel to each of the face 710a of the first grip portion 710, the back face 700a of the ferrule, the face 720a of the second grip portion 720, and the front face 750 of the ferrule.

The ferrule and corresponding portions of optical fibers are bonded to each other with an adhesive cast into the second space 721, and the support face 725 functions as a surface for increasing adhering regions between the optical fibers and the ferrule and improving bonding strength. In other words, by providing the support face 725 parallel to the insertion direction D of optical fibers as a bonding surface, the bonding surface (support face 725) contributes to adhesion as a resistive force against a withdrawing force of the optical fibers. Further, the support face 725 is provided with guide grooves 724 corresponding to the second through holes 722. The guide grooves 724 extend along the insertion direction D of optical fibers and are connected to the associated second through holes 722 in the second grip portion 720. This ensures that the distal ends of optical fibers are surely introduced into the second through holes 722 even if the insertion direction of the distal ends of optical fibers deviates in the horizontal direction.

Further, the ferrule for optical connector has a window 730 for communicating the first space 711 to the outside of the ferrule, in a surface 731, which is a surface defining the first space 711, located in parallel with the insertion direction D of optical fibers. This permits a worker quickly to mount the ferrule on the optical fiber ends as observing the positions of optical fiber ends through the window 730, which improves work efficiency and which can fully achieve the object of the invention, based on the structural features as described above.

The reason why the projection portion 26 provided on the bottom part 20a of the recess portion 20 in the lower die 2 is constructed so that it comes into contact with the lower grip plate 4b of the core pin grip plate 4 when the upper die 1 and lower die 2 are brought into close fit, as described above, is that the window 730 is purposed to form.

Figure 9:
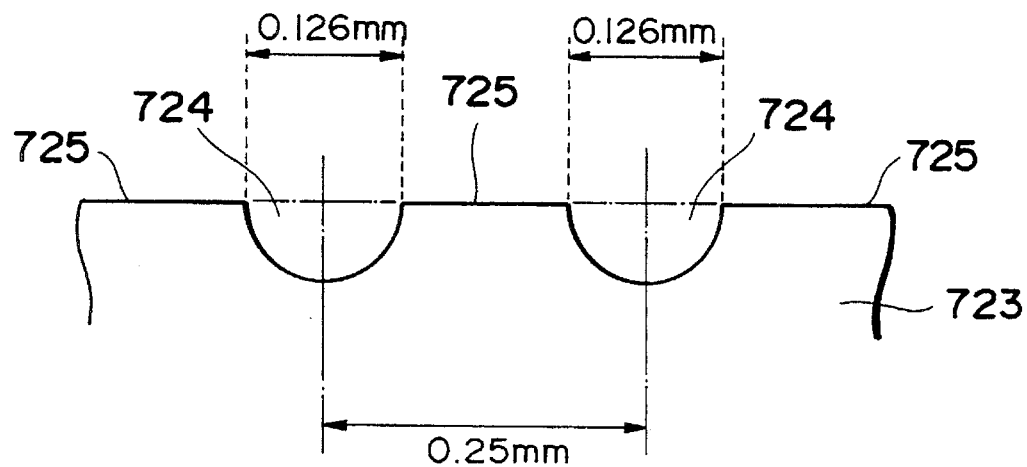
FIG. 9 is a drawing to show the structure of guide grooves 724 provided in pedestal portion 723 in the ferrule for optical connector shown in FIG. 7.
Figure 10:
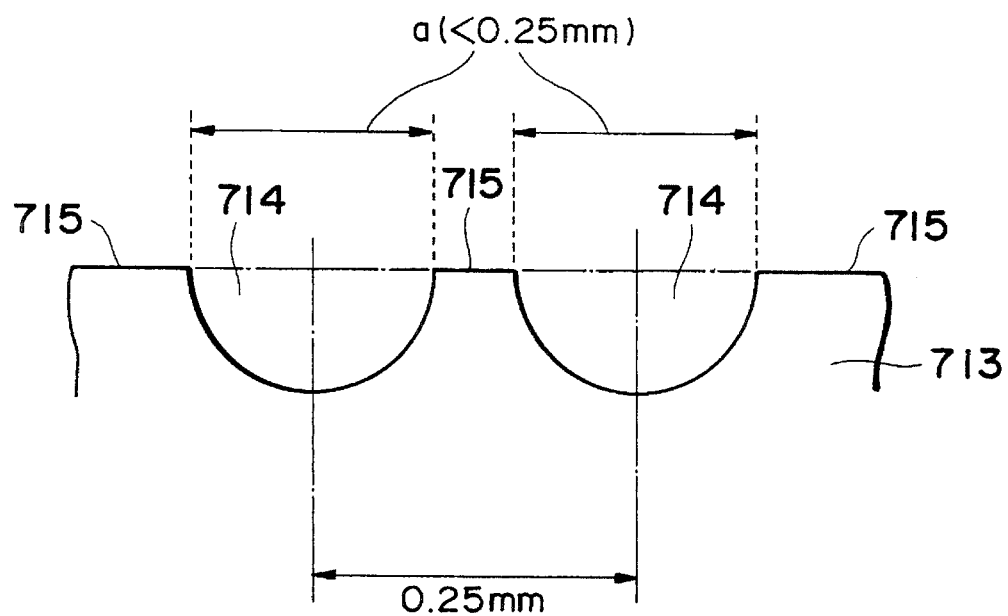
FIG. 10 is a drawing to show the structure of guide grooves 714 provided in pedestal portion 713 in the ferrule for optical connector shown in FIG. 7.

FIG. 9 is a drawing to show a cross section of the second pedestal portion 723 in the normal direction to the insertion direction D of optical fibers in order to illustrate the configuration of the guide grooves 724 provided on the support face 725 of the second pedestal portion 723 as described above. Further, FIG. 10 is a drawing to show a cross section of the first pedestal portion 713 in the normal direction to the insertion direction D of optical fibers in order to illustrate the configuration of guide grooves 714 provided on the guide face 715 of the first pedestal portion 713 as described above. As shown in these figures, the thin portions 3a and thick portions 3b of core pins 3 are both circular in cross section, and arrangement pitches of the core pins 3 are constant (0.25 mm). Thus, the thin portions 3a and thick portions 3b of core pins 3 can be freely set in diameter within the range not to change the arrangement pitches fixed in the core pin grip plate 4.

Next described in order referring to FIGS. 11 to 18 are the structure of the ferrule for optical fiber according to the present invention, the dies prepared for producing this ferrule, and the operation for fixing the optical fibers (optical fiber tape) to the ferrule thus produced using the dies.

For convenience sake, the end face side for connection to optical connector (end face 750), of the ferrule is called as front while the fiber-inserting side (end face 700a) thereof as rear.

[I] Production Process of Ferrule:

FIG. 11 is a cross section of the dies for producing the ferrule. This cross section is one taken along A—A line of FIG. 2.

FIG. 12 is a cross section of the ferrule produced using the dies of FIG. 1. This cross section is one taken along B—B line in FIG. 7.

Figure 13:
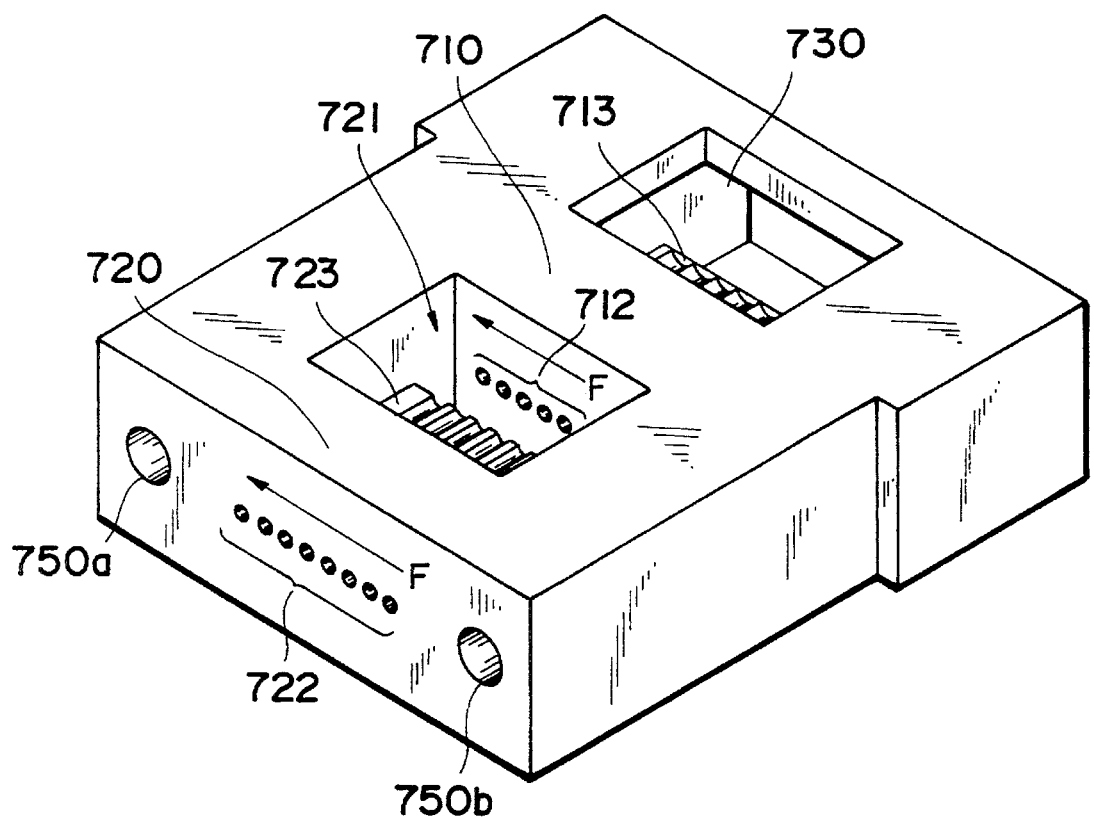
FIG. 13 is a perspective view to show an overall configuration of the ferrule for optical connector shown in FIG. 12.

FIG. 13 is a perspective view of the ferrule produced using the dies in FIG. 1. This figure shows a final product obtained by removing the stems 740 from the ferrule shown in FIG. 7.

In FIG. 11, to be ready for producing the ferrule for optical connector, the core pins 3 for forming the through holes for optical fibers are set on two points of a pin positioning portion 700b located ahead of the cavity and a pin positioning portion 700c in the cavity in the lower metal die 2, and then the core pins 3 are fixed by clamping them by the upper metal die 1.

The pin positioning portion 700b located ahead the cavity in the dies is composed of the first upper grip portion 14 and the first lower grip portion 24, while the other pin positioning portion 700c in the cavity is composed of the second upper grip portion 12 and the second lower grip portion 22. The cavity is defined by the recess portion 10 of the upper die 1 and the recess portion 20 of the lower die 2. Further, region 700d shows a contact region between the projection portion 2b of the lower die 2 and the core pin lower grip plate 4b, and this structure forms the window 730. Regions 700e, 700f show contact regions between the core pin grip plate 4 and the engagement grooves 15, 25, respectively, of the upper and lower metal dies 1, 2.

This arrangement that the core pins 3 for forming the fiber holes are supported at the at least two points in the dies can prevent the core pins 3 from being bent upon pouring the plastic. Next the plastic is poured into the cavity in the dies and is let to solidify, thereby forming the ferrule of the present invention.

After molding, the core pins 3 are withdrawn from the dies, grasping the core pin grip plate 4, and the end faces of the resulted ferrule for optical connector (FIG. 7) are polished, thereby completing the fabrication of the plastic ferrule for optical connector shown in FIGS. 12 and 13.

[II] Structure of Ferrule:

Next, the structural features of the plastic ferrule for optical connector according to the present invention, produced in the above manner, are described together with procedures for introduced the optical fibers into the plastic ferrule.

Since the plastic is poured to solidify while the core metal pins 3 are positioned by the second upper grip portion 12 of the upper metal die 1 and the second lower grip portion 22 of the lower metal die 2 in the cavity, the ferrule-passing portion (space 721) is produced between the first grip portion 710 and the second grip portion 720, as shown in FIGS. 12 and 13.

In FIG. 12, the thin portions 712a for through holes of optical fibers and the thick portions 712b for through holes of optical fibers with a larger diameter are concentrically arranged behind the space 721 (or in the first grip portion 710), and the tapered portion 712c is provided between the thin portion 712a for through hole and the thick portion 712b for through hole.

Also, the window 730 is provided in the space 711 of the plastic ferrule for optical connector so as to expose part of the thick portions 71 2b for through holes (the guide surface 714 of the first pedestal portion 713).

Procedures of insertion of optical fibers into the plastic ferrule for optical connector are next described in detail referring to FIGS. 15 to 18.

Figure 14:
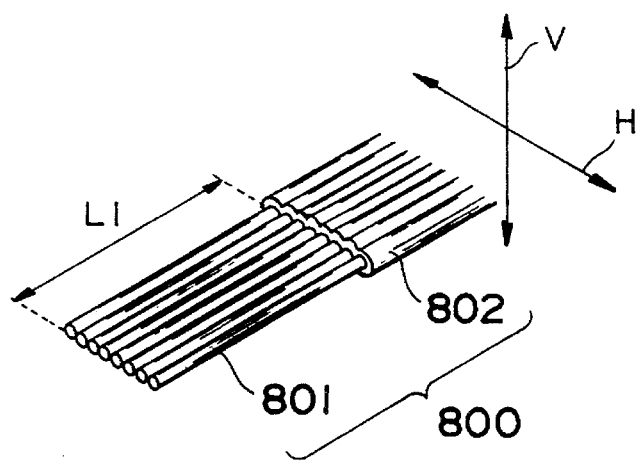
FIG. 14 is a perspective view to show a fiber tape integrally covering a plurality of bare fibers with a plastic, as optical fibers to which the ferrule for optical connector according to the present invention is mounted.

The optical fibers to which the plastic ferrule for optical connector is mounted are an optical fiber tape 800 obtained by integrally coating a plurality of bare optical fibers 801 with a resin 802 (plastic coating) such as a plastic. From the optical fiber tape 800, the coating is stripped off by a distance L1 from the distal ends thereof so as to expose the bare optical fibers 801, as shown in FIG. 14. Each of the bare fibers comprises a core for propagating light in a longitudinal direction thereof and a cladding covering the core and having a lower refractive index than the core.

Figure 15:
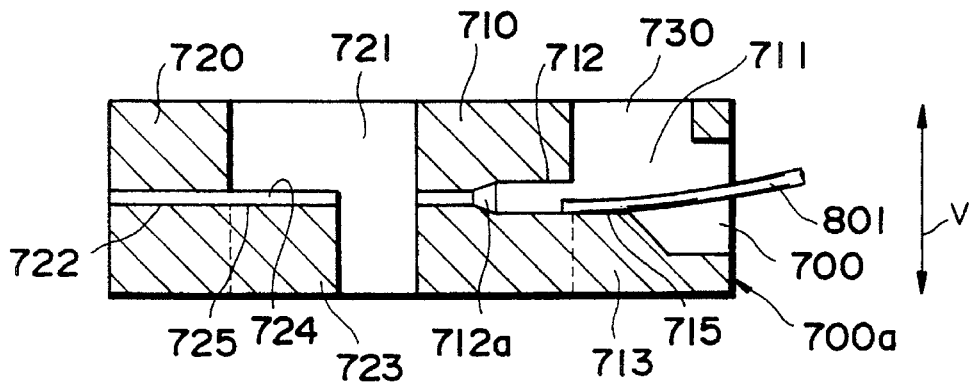
FIG. 15 is a drawing to illustrate a first mount operation of optical fiber ends to the ferrule for optical connector according to the present invention.

FIG. 15 is a diagrammatic drawing to show a state in which the guide surface 715 of the first pedestal portion 713 is seen through the window 730.

In this drawing, observing the guide surface 715 of the first pedestal portion 713 through the window 730, the optical fibers can be readily introduced into the first through holes 712 while mounting the distal ends of the individual optical fibers 801 on the guide grooves 714 corresponding to the respective optical fibers.

Figure 16:
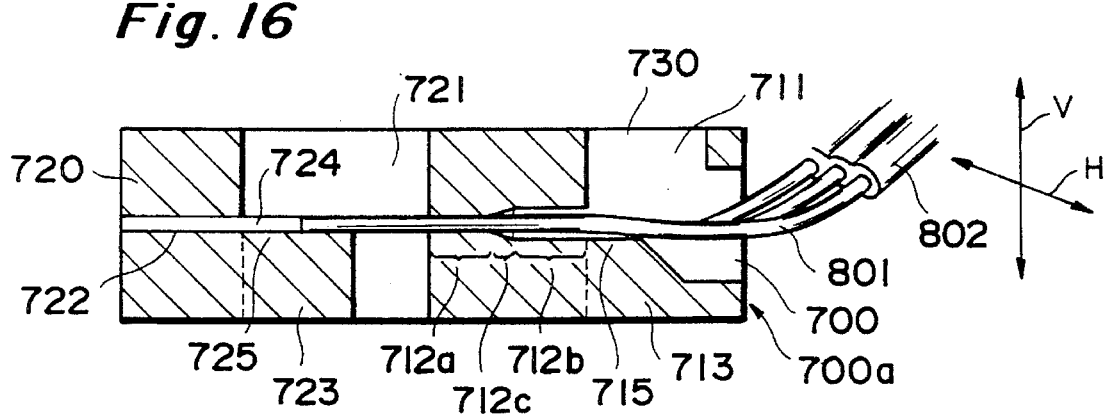
FIG. 16 is a drawing to illustrate a second mount operation of optical fiber ends to the ferrule for optical connector according to the present invention.

FIG. 16 is a diagrammatic drawing to show a state in which, pushing the optical fibers, the distal ends thereof are made to come out in the space 721 provided between the first grip portion 710 and the second grip portion 720 as having passed through the thick portions 712b, the tapered portions 712c, and the thin portions 712a of the first through holes 712 in this order.

In this drawing, pushing the optical fibers, the distal ends of the optical fibers are readily made to come out into the space 721 because the diameter of the first through holes 712 gradually decreases.

Figure 17:
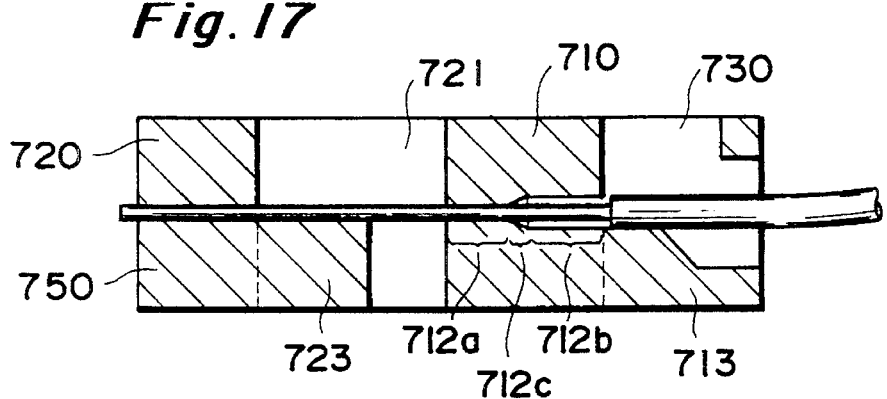
FIG. 17 is a drawing to illustrate a third mount operation of optical fiber ends to the ferrule for optical connector according to the present invention.

FIG. 17 is a diagrammatic drawing to show a state in which the optical fibers coming out into the space 721 are further pushed to project out from the front face 750 of the plastic ferrule for optical connector.

In this drawing, the optical fibers coming out into the space 721 can be readily mounted on the support face 725 of the second pedestal portion 723 by moving the optical fibers vertically and horizontally (in the V direction and the H direction shown in FIG. 16) behind the ferrule. Further, because the support face 725 is provided with the guide grooves 724, the distal ends of the optical fibers come to project out from the front face 750 of the ferrule through the second through holes 722 by pushing the optical fibers.

Figure 18:
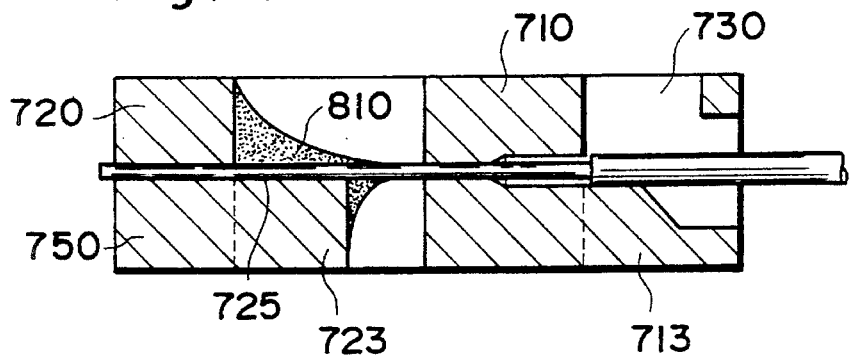
FIG. 18 is a drawing to illustrate a fourth mount operation of optical fiber ends to the ferrule for optical connector according to the present invention.

FIG. 18 shows a state in which the distal ends of the optical fibers inserted in the above manner and the ferrule for optical connector are fixed with an adhesive 810. On this occasion, the support face 725 of the second pedestal portion 723 functions to prevent the adhesive 810 from dropping below the ferrule (down in the drawing).

Employing the structure as described above, the ferrule for optical connector according to the present invention has the following advantages.

Since the ferrule for optical connector is provided with the window 730 and the guide surface 715, the optical fibers can be readily introduced into the first through holes while mounted on the guide grooves 714 upon insertion of optical fibers.

Further, because the first through holes 712 are arranged to decrease the diameter thereof in the order of the thick portions 712b, tapered portions 712c, and thin portions 712a so as to permit the distal ends of optical fibers to project out into the space 721, the optical fibers can be readily mounted on the support face 725 of the second pedestal portion 723 in the front portion of ferrule simply by moving the optical fibers vertically (in the V direction in FIGS. 14, 15, and 16) or horizontally (in the H direction in FIGS. 14 and 16) behind the ferrule, and the distal ends of the fibers can be pushed out from the front face 750 of the ferrule.

A material for forming the ferrule for optical connector of the present invention is preferably a material with high heat resistance and high dimension stability such as an epoxy resin with inorganic fillers such as glass fibers mixed therein.

Further, the molding means for producing the ferrule for optical connector of the present invention is preferably the transfer molding, the injection molding, etc.

As described above, according to the structure of the present invention, the distal ends of the core pins for forming the fiber holes are positioned in the front portion of cavity in the dies and the middle portions of the core pins are positioned in the cavity in the dies, and the portion to become the end face for connection of the ferrule is set between the two pin positioning portions, whereby bending of the pins upon pouring of resin, that is, bending of the fiber holes in the ferrule can be prevented. In addition, since the insertion holes with the diameter gradually decreasing stepwise are employed as the insertion holes for optical fibers in the ferrule, workability can be extremely improved upon inserting the optical fibers, while decreasing deviation of the insertion holes of optical fibers and angular deviation to become a factor of connection losses of optical connector, due to polishing the end faces.

Further, because the present invention includes the first and second pedestal portions 713, 723, insertion of optical fibers can be readily done into the first and second through holes 712, 722. In addition, because the guide grooves 714, 724 are further provided in the respective pedestal portions, reliability and work efficiency of insertion operation can be greatly improved.

The adhesive for adhering the ferrule to the optical fibers can be fully held in the second space 721 by the second pedestal portion, whereby the ferrule can be firmly fixed to the distal ends of optical fibers.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 99156/1994 filed on Apr. 14, 1994 is hereby incorporated by reference.

What is claimed is:

1. A ferrule for optical connector, which is to be mounted to a distal end of an optical fiber, comprising:

a first grip portion having a first through hole for said optical fiber to be introduced therethrough and gripping a part of said optical fiber apart a determined distance from the distal end of said optical fiber;

a second grip portion located to constitute a front face of said ferrule along an insertion direction of said optical fiber and opposed to said first grip portion through a first space, said second grip portion having a second through hole for the optical fiber set through said first through hole to be further introduced therethrough and gripping the vicinity of the distal end of said optical fiber; and a first pedestal portion projecting from a surface of said second grip portion, which is opposed to said first grip portion through said first space, toward said first grip portion, said first pedestal portion having a first face opposed to a portion of a predetermined length of said optical fiber along the insertion direction of said optical fiber and a second face apart a predetermined distance from said first grip portion through said first space.

2. The ferrule for optical connector according to claim 1, wherein said first pedestal portion is provided with a guide groove in said first face, said guide groove extending along the insertion direction of said optical fiber and connected to the second through hole of said second grip portion.

3. 1 The ferrule for optical connector according to claim 1, wherein said first grip portion partitions a space inside the ferrule into said first space and a second space and wherein the ferrule for optical connector further comprises an opening portion for introduced the distal end of said optical fiber from the outside of the ferrule into said second space, in a back face of the ferrule opposed to said first grip portion through said second space.

4. The ferrule for optical connector according to claim 3, further comprising a second pedestal portion projecting from a surface of said first grip portion, which is opposed to said opening portion through said second space, toward said opening portion, said second pedestal portion having a guide surface for guiding the distal end of the optical fiber inserted through said opening portion into said second space, into the first through hole of said first grip portion.

5. The ferrule for optical connector according to claim 4, wherein said guide surface of the second pedestal portion is opposed to a portion of a predetermined length of the optical fiber along the insertion direction of said optical fiber.

6. The ferrule for optical connector according to claim 4, wherein said first pedestal portion is provided with a guide groove in said guide surface, said guide groove extending along the insertion direction of said optical fiber and connected to the first through hole of said first grip portion.

7. The ferrule for optical connector according to claim 3, further comprising a window for connecting said second space to the outside of the ferrule, in a surface defining said second space and located in parallel to the insertion direction of said optical fiber.

8. A ferrule for optical connector, which is to be mounted to a distal end of an optical fiber, comprising:

an opening portion provided in a back face of the ferrule, for introducing the distal end of said optical fiber into a first space inside the ferrule from the outside;

a first grip portion arranged along an insertion direction of said optical fiber and opposed to said opening portion through said first space, said first grip portion having a first through hole for the optical fiber set through said opening portion to be further introduced therethrough, gripping part of said optical fiber apart a predetermined distance from the distal end of said optical fiber, and partitioning a space inside the ferrule into said first space and a second space;

a second grip portion located to constitute a front face of the ferrule along the insertion direction of said optical fiber and opposed to said first grip portion through said second space, said second grip portion having a second through hole for the optical fiber set through said first through hole to be further introduced therethrough and gripping the vicinity of the distal end of said optical fiber; and a first pedestal portion projecting from a surface of said first grip portion, which is opposed to said opening portion through said first space, said first pedestal portion having a guide surface for guiding the distal end of the optical fiber inserted through said opening portion into said first space, into the first through hole of said first grip portion.

9. The ferrule for optical connector according to claim 8, wherein said guide surface of the first pedestal portion is opposed to a portion of a predetermined length of the optical fiber along the insertion direction of said optical fiber.

10. The ferrule for optical connector according to claim 8, wherein said first pedestal portion is provided with a guide groove in said guide surface, said guide groove extending along the insertion direction of said optical fiber and connected to the first through hole of said first grip portion.

11. The ferrule for optical connector according to claim 8, further comprising a window for connecting said first space to the outside of the ferrule, in a surface defining said first space and located in parallel to the insertion direction of said optical fiber.

12. The ferrule for optical connector according to claim 8, further comprising a second pedestal portion projecting from a surface of said second grip portion, which is opposed to said first grip portion through said second space, toward said first grip portion, said second pedestal portion having a first face for supporting a portion of a predetermined length of said optical fiber and a second face apart a predetermined distance from said first grip portion through said second space.

13. The ferrule for optical connector according to claim 12, wherein said first pedestal portion is provided with a guide groove in said first face, said guide groove extending along the insertion direction of said optical fiber and connected to the second through hole of said second grip portion.

14. A ferrule for optical connector, which is to be mounted to a distal end of a fiber tape in which a plurality of optical fibers are incorporated with a coating and into which bare optical fibers exposed by removing said coating by a predetermined distance from the distal end of said fiber tape are to be inserted, said ferrule for optical connector comprising:

an opening portion provided in a back face of the ferrule, for introducing distal ends of said plurality of bare optical fibers into a first space inside the ferrule from the outside;

a first grip portion arranged along an insertion direction of said optical fibers and opposed to said opening portion through said first space, said first grip portion having a plurality of first through holes for the optical fibers set through said opening portion to be further introduced therethrough, gripping a part of each of said optical fibers apart a predetermined distance from the distal ends of said optical fibers, and partitioning a space inside the ferrule into said first space and a second space;

a second grip portion located to constitute a front face of the ferrule along the insertion direction of said optical fibers and opposed to said first grip portion through said second space, said second grip portion having a plurality of second through holes for the optical fibers set through said first grip portion to be further introduced therethrough and gripping the vicinity of the distal ends of said optical fibers; and a first pedestal portion projecting from a surface of said second grip portion, which is opposed to said first grip portion through said second space, toward said first grip portion, said first pedestal portion having a support face opposed to a portion of a predetermined length of said each optical fiber along an arrangement direction of said second through holes.

15. The ferrule for optical connector according to claim 14, wherein said first pedestal portion is provided with a plurality of guide grooves in said support face, extending along the insertion direction of said optical fibers and connected to the second through holes of said second grip portion.

16. The ferrule for optical fiber according to claim 14, further comprising a second pedestal portion projecting from a surface of said first grip portion, which is opposed to said opening portions through said first space, toward said opening portions, said second pedestal portion having a guide surface for guiding the distal ends of the optical fibers inserted through said opening portion into said first space, into the first through holes of said first grip portion.

17. The ferrule for optical connector according to claim 14, wherein said guide surface of said second pedestal portion is opposed to a portion of a predetermined length of said each optical fiber along the insertion direction of said optical fibers.

18. The ferrule for optical connector according to claim 16, wherein said second pedestal portion is provided with a plurality of guide grooves in said guide surface, extending along the insertion direction of said optical fibers and connected to the first through holes of said first grip portion.

19. Dies for forming the ferrule as set forth in claim 1, said dies comprising an upper die and a lower die, each having a recess portion processed in a predetermined shape so that a cavity for forming the ferrule is made when main surfaces of the dies are brought into close fit while pinching core pins for forming through holes for insertion of optical fibers;

wherein said upper die has a first upper grip portion for gripping the vicinity of distal ends of said core pins, said first grip portion being provided at a predetermined position in the main surface of said upper die, and a second upper grip portion for gripping a predetermined part of said core pins apart a predetermined distance from the distal ends of said core pins, said second upper grip portion having a grip face for pushing the predetermined part of said core pins and normally projecting from a bottom part of the recess portion of said upper die surrounded by the main surface of said upper die;

wherein said lower die comprises a first lower grip portion for gripping the vicinity of the distal ends of said core pins together with said first upper grip portion, said first lower grip portion being provided at a position coincident with the position of said first upper grip portion when the upper die and the lower die are brought into close fit while pinching the core pins for forming the through holes for insertion of optical fibers, and a second lower grip portion for gripping a part of said core pins together with said second upper grip portion, said second lower grip portion normally projecting from a bottom part of the recess portion of said lower die and having a grip face opposed to the grip face of the second upper grip portion when said upper die and said lower die are brought into close fit while pinching the core pins for forming the through holes for insertion of optical fibers; and wherein a length in the insertion direction of said core pins, of the grip face provided in said second lower grip portion is greater than a length in the insertion direction of said core pins, of the grip face provided in said second upper grip portion.

20. The dies according to claim 19, wherein a length in a direction normal to the insertion direction of said core pins, of the grip face provided in said second lower grip portion is equal to a length in the direction normal to the insertion direction of said core pins, of the grip face provided in said second upper grip portion.

21. The dies according to claim 19, wherein said lower die further comprises guide grooves in said first lower grip portion, for positioning said core pins along the insertion direction of said core pins, and said lower die further comprises guide grooves in the grip face of said second lower grip portion, for positioning said core pins along the insertion direction of said core pins.

22. The dies according to claim 19, wherein said upper die further comprises an upper engagement groove for gripping a core pin grip plate pinching to secure one ends of said core pins together with said lower die, in the main surface of said upper die and at a position opposite to said first upper grip portion through the recess portion of said upper die, and wherein said lower die further comprises a lower engagement groove for gripping said core pin grip plate together with said upper die, in the main surface of said lower die and at a position opposite to said first lower grip portion through the recess portion of said lower die.

23. The dies according to claim 22, wherein said lower die further comprises a projection portion located between said second lower grip portion and said lower engagement groove and normally projecting from the bottom part of the recess portion of said lower die, said projection portion coming into contact with said core pin grip plate when said upper die and lower die are brought into close fit.

24. The dies according to claim 19, wherein said lower die further comprises a groove in the main surface of said lower die, for communicating the recess portion of said lower die to the outside of said lower die, whereby when said upper die and lower die are brought into close fit, said groove and the main surface of said upper die define a gate for communicating a cavity formed by the recess portion of said upper die and the recess portion of said lower die to the outside of said dies.

25. A process for producing a ferrule for an optical connector, comprising the steps of:

preparing upper and lower dies, each having a recessed portion of predetermined shape so that a ferrule forming cavity is defined when main surfaces of the dies are brought together while pinching core pins for forming through holes for insertion of optical fibers, wherein the upper die has a first upper grip portion for gripping the vicinity of distal ends of the core pins, the first grip portion being provided at a predetermined position in the main surface of the upper die, and a second upper grip portion for gripping a predetermined part of the core pins apart a predetermined distance from the distal ends of the core pins, the second upper grip portion having a grip face for pushing the predetermined part of the core pins and normally projecting from a bottom part of the recessed portion of the upper die surrounded by the main surface of the upper die, wherein the lower die comprises a first lower grip portion for gripping the vicinity of the distal ends of the core pins together with the first upper grip portion, the first lower grip portion being provided at a position coincident with the position of the first upper grip portion when the upper die and the lower die are brought into close fit while pinching the core pins for forming the through holes for insertion of optical fibers, and a second lower grip portion for gripping a part of the core pins together with the second upper grip portion, the second lower grip portion normally projecting from a bottom part of the recess portion of the lower die and having a grip face opposed to the grip face of the second upper grip portion when the upper and lower dies are brought together while pinching the core pins for forming the through holes for insertion of optical fibers, and wherein the length in the insertion direction of the core pins, of the grip face provided in the second lower grip portion is greater than a length in the insertion direction of the core pins, of the grip face provided in the second upper grip portion;

bringing the upper and lower dies together;

pouring a resin into the cavity formed by the recessed portions of the upper and lower dies through a gate defined by the upper and lower dies, thereby resin-molding the ferrule;

allowing the resin to solidify;

withdrawing the core pins; and separating the upper and lower dies to obtain a ferrule for optical connector resin-molded in a same shape as the cavity.

26. The production process according to claim 25, wherein said resin molding is either transfer molding or injection molding.

* * * * *